Figures 1, 2:
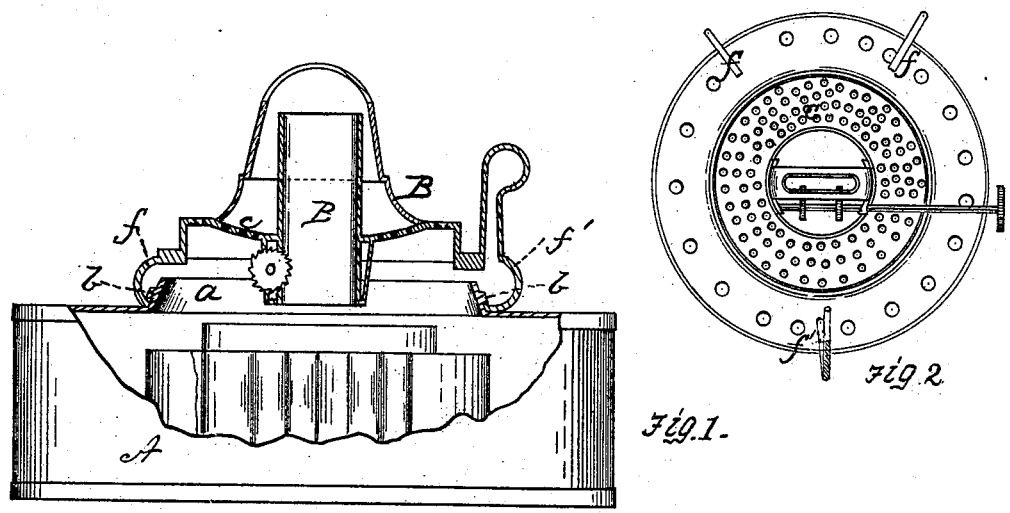

D. SEAWRIGHT.
Lamp-Burner.

No. 211,597. Patented Jan. 21, 1879.

Witnesses
J. K. Smith
B. D. Smith

Inventor
David Seawright
By Bakewell & Kerr
Attys

UNITED STATES PATENT OFFICE.

DAVID SEAWRIGHT, OF NEW BRIGHTON, PENNSYLVANIA.

IMPROVEMENT IN LAMP-BURNERS.

Specification forming part of Letters Patent No. 211,597, dated January 21, 1879; application filed July 19, 1878.

*To all whom it may concern:*

Be it known that I, DAVID SEAWRIGHT, of New Brighton, in the county of Beaver and State of Pennsylvania, have invented a new and useful Improvement in the Attachment of Burners to Lamps; and I do hereby declare the following to be a full, clear, and exact description thereof, reference being had to the accompanying drawings, forming part of this specification, in which—

Figure 1 is a sectional view of an open-top lamp and its burner. Fig. 2 is a detached view of the burner.

Like letters refer to like parts wherever they occur.

My invention relates to the construction and application of burners to open-top or gas-consuming lamps; and consists in combining, with an open-top or gas-consuming lamp, a burner having a perforated diaphragm, which will permit the passage of air and gas to the burner, and provided with either a spring-catch or a clamp, by which the burner may be so secured to the lamp as to be readily detachable, and so as to give a free draft under the diaphragm.

Heretofore, in the construction and attachment of burners to open-top lamps, the old threaded collar has been commonly employed, and, as the same has to be set and soldered centrally of the opening in the lamp, it not only adds to the cost of manufacture, but causes the diaphragm of the burner and the gallery for the chimney to sit so low as to materially obstruct the free entrance of air to mingle with the gases which rise from the lamp. A free entrace of air below the burner is very desirable—first, to keep the body of the oil in the lamp as cool as possible, and, secondly, as before specified, for purposes of combustion and to induce the flow of gas to the burner.

The main object, therefore, of the present invention is to obviate the difficulties specified.

I will now proceed to describe my invention, so that others skilled in the art to which it appertains may apply the same.

In the drawings, A indicates the fount of a lamp, which may be of metal, glass, or other suitable material, and which is formed with a wide opening, as at $a$, or in manner or form approved for open-top or gas-consuming lamps. Around this opening $a$ is a bead, $b$, or its equivalent, lugs, or a recess, for the reception of the clamps of the burner. In glass founts this groove, bead, or like device can be readily made at the time of forming the lamp.

B indicates the burner, provided with the perforated diaphragm $c$ to permit the gas to rise to the flame, and also to admit the air to the burner. To the base of burner B, I attach a clamp or clamps, which may be in the nature of a spring-clamp, or hooks, $f\,f$, and spring $f'$; or, in lieu of the spring $f'$, an arm and screw may be employed, constituting the whole a rigid clamp. The clamp thus formed is adapted to take hold of the fount below the bead $b$, and thus secure the burner to the lamp, and the arms or hooks $f\,f\,f'$ constituting the clamp must be of such length as to hold the burner sufficiently far above the edge of the opening $a$ as to insure a free draft or air-space.

The burner, with diaphragm and clamp, as described, is readily attached and detached from the lamp, and when in position on the lamp all air supplied to the burner will have unobstructed ingress, so that it will pass over opening $a$ of the lamp, thus tending to keep the contents of the lamp cool, and carrying any gas formed in the lamp with the air to the flame.

I am aware that spring-catches have been provided on the collar or cap of a lamp or like article, said catches adapted to enter recesses formed in the outer side of the neck of a lamp in order to secure the parts together without the use of cement, but such attachments were of a permanent nature; and I am also aware that a clamp at the base of a burner for closed-top lamps has been employed to detachably secure the burner, while dispensing with collar and cements, and do not herein claim such subject-matter; but,

Having thus described my invention, what I claim, and desire to secure by Letters Patent, is—

A burner for open-top or gas-consuming lamps having perforated diaphragm $c$ and clamps $f\,f\,f'$, whereby the burner may be detachably attached to the lamp, so as to leave a free draft-space under the diaphragm and over the opening in the top of the lamp, substantially as and for the purpose specified.

In testimony whereof I, the said DAVID SEAWRIGHT, have hereunto set my hand.

DAVID SEAWRIGHT.

Witnesses:
F. W. RITTER, Jr.,
J. K. SMITH.